(12) United States Patent
Tsuda et al.

(10) Patent No.: US 6,799,242 B1
(45) Date of Patent: Sep. 28, 2004

(54) OPTICAL DISC PLAYER WITH SLEEP MODE

(75) Inventors: Hiroyuki Tsuda, Ichinomiya (JP); Takayuki Suzuki, Gifu-ken (JP); Tomonori Kamiya, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/518,343

(22) Filed: Mar. 3, 2000

(30) Foreign Application Priority Data

| Mar. 5, 1999 | (JP) | 11-058744 |
| Mar. 24, 1999 | (JP) | 11-079731 |
| Jun. 7, 1999 | (JP) | 11-159886 |

(51) Int. Cl.[7] ............................................. G06F 12/00
(52) U.S. Cl. ........................ 711/106; 711/112; 711/113; 711/145; 711/156; 369/8
(58) Field of Search ................................ 711/106, 112, 711/113, 145, 154; 369/8; 713/323

(56) References Cited

U.S. PATENT DOCUMENTS

| 5,313,428 A | * | 5/1994 | Inoue | 365/222 |
| 5,365,487 A | * | 11/1994 | Patel et al. | 365/226 |
| 5,487,047 A | * | 1/1996 | Oka | 369/30.23 |
| 5,606,290 A | | 2/1997 | Pang | |
| 5,634,106 A | * | 5/1997 | Yaezawa et al. | 711/106 |
| 5,659,762 A | * | 8/1997 | Sawada et al. | 713/323 |
| 5,687,382 A | * | 11/1997 | Kojima et al. | 713/320 |
| 5,940,352 A | * | 8/1999 | Moriguchi | 369/30.07 |
| 6,216,233 B1 | * | 4/2001 | Baweja | 713/322 |
| 6,272,081 B1 | * | 8/2001 | Murata | 369/47.15 |

FOREIGN PATENT DOCUMENTS

| JP | 64-62023 | 3/1989 |
| JP | 4104521 | 4/1992 |
| JP | 4167268 | 6/1992 |
| JP | H5-11874 | 1/1993 |
| JP | H5-54518 | 3/1993 |
| JP | H6-259935 | 9/1994 |
| JP | 8255409 | 10/1996 |
| JP | H11-079731 | 7/2002 |

* cited by examiner

*Primary Examiner*—Donald Sparks
*Assistant Examiner*—Ngoc V Dinh
(74) *Attorney, Agent, or Firm*—Fish & Richardson P.C.

(57) ABSTRACT

An optical disc player enters a sleep (low power consumption) mode when inactive for a predetermined time. The optical disc player includes a buffer RAM for storing index information read from a disc. A refresh circuit is connected to the buffer RAM to refresh the RAM. The refresh circuit includes a reference clock generator which generates a reference clock signal having a predetermined frequency from a reference clock using an oscillator. When the disc player enters the sleep mode, it issues a stop signal to the reference clock generator, which then stops generating the reference clock signal and produces a sleep mode clock signal having a frequency necessary to refresh the buffer RAM. A refresh signal generator circuit connected to the reference clock generator produces a refresh signal for the buffer RAM using the sleep mode clock signal. A control circuit connected to the refresh circuit produces the stop signal when it receives a sleep command and deactivates the stop signal when it receives a recovery command. Since the oscillator is stopped during the sleep mode, the disc player dissipates very little power in the sleep mode.

25 Claims, 12 Drawing Sheets

OPTICAL DISC PLAYER WITH SLEEP MODE

BACKGROUND OF THE INVENTION

The invention relates to an optical disc player which reads data from a recording medium, such as a compact disc (CD) or a digital video disc (DVD), and more particularly, to a reduction in the power consumption of an optical disc player in a sleep mode.

In a CD-ROM system, a digital audio CD is utilized as a read only memory (ROM) for storing digital data. A personal computer which is provided with such a CD-ROM system has a sleep mode which periodically interrupts information processing while maintaining a power on condition. The sleep mode reduces the power consumption of the computer, allowing the useful battery life for a portable personal computer, for example, to be extended.

FIG. 1 is a schematic block diagram of a conventional optical disc player 100, which comprises a pickup 1, a pickup control circuit 3, an analog signal processor circuit 4, a digital signal processor circuit 5, a CD-ROM decoder 6, a buffer RAM 7 and a control microcomputer 8.

The pickup 1 irradiates a disc 2 with light to produce a voltage signal which conforms to the intensity of light reflected. The pickup control circuit 3 controls the position of the pickup 1 on the disc 2 so that the pickup 1 can read data recorded on the disc 2 in a proper sequence. A servo control which controls spin of the disc 2 at a given speed is performed with the position control of the pickup 1, thereby assuring that a constant linear or angular velocity over tracks on the disc 2 is maintained.

The analog signal processor circuit 4 receives the voltage signal from the pickup 1 and produces an EFM (eight to fourteen modulation) signal of 588 bits in one frame.

The digital signal processor circuit 5 receives the EEM signal from the analog signal processor circuit 4 and performs EFM demodulation. The demodulated signal is subject to CIRC (Cross Interleave Reed Solomon Code) decoding, whereby 24-bytes per frame CD-ROM data is produced.

The CD-ROM decoder 6 performs a decoding operation including a read error detection and error correction on the demodulated CD-ROM data received from the digital signal processor circuit 5, and reproduced CD-ROM data is then provided to a host computer.

The buffer RAM 7 is connected with the CD-ROM decoder 6 to temporally store the CD-ROM data supplied from the digital signal processor circuit 5 to the CD-ROM decoder 6 in units of one block. Since the error correction is performed on one block of data, the CD-ROM decoder 6 requires at least one block of CD-ROM data. In this manner, as CD-ROM data is sequentially read, one block of CD-ROM data is temporarily stored in the buffer RAM 7. The control microcomputer 8 is a single chip microcomputer having a ROM and a RAM. A control program is stored in the ROM for controlling the CD-ROM decoder 6. The control microcomputer 8 temporarily stores command data from the host computer or sub-code data supplied from the digital signal processor circuit 5 in its internal RAM. The control microcomputer 8 performs various control operations in accordance with commands from the host computer so that CD-ROM data is provided from the CD-ROM decoder 6 to the host computer.

Also recorded on the disc 2 is a table of contents (or TOC data) including index information which indicates what data is recorded at which position. As soon as the optical disc 2 is loaded into the optical disc player 100, the index information is immediately read and stored in the buffer RAM 7 at a given address. Data retrieval using the TOC data allows CD-ROM data to be efficiently read from the buffer RAM 7.

FIG. 2 is a schematic block diagram of the CD-ROM decoder 6. The CD-ROM decoder 6 comprises an input interface 11, a signal processor circuit 12, a host interface 13, a memory control circuit 14, a microcomputer interface 15 and a switch 16. The buffer RAM 7 is connected to the memory control circuit 14 and comprises a dynamic random access memory (DRAM).

When reading the TOC data from the disc 2, the control microcomputer 8 causes the microcomputer interface 15 to deliver a switching signal SW, which moves the switch 16 to enable a transfer of the TOC data to the control microcomputer 8. The transfer of the TOC data is repeated three times to guard against a failure of the disc 2. The control microcomputer 8 writes only one of these TOC data items to the buffer RAM 7 at a given address via the memory control circuit 14.

The input interface 11 descrambles the CD-ROM data from the digital signal processor circuit 5 which is digitally processed and formatted, and the descrambled CD-ROM data is provided to the buffer RAM 7 via the memory control circuit 14.

The signal processor circuit 12 reads one block of CD-ROM data stored in the buffer RAM 7 and performs an error detection and an error correction process thereon. One block of CD-ROM data includes a sync signal and an error correction code ECC, and normally comprises 2352 bytes. Erroneous data in the buffer RAM 7 is corrected under the control of the memory control circuit 14.

The host interface 13 interfaces with the host computer, and reads CD-ROM data from the buffer RAM 7, where it is saved, and provides it to the host computer. The host interface 13 also receives a variety of control commands from the host computer, and provides them to the control microcomputer 8.

The memory control circuit 14 controls delivery and transfer of the CD-ROM data between the input interface 11, the signal processor circuit 12, and the host interface 13 on one hand and the buffer RAM 7 on the other hand. DATA entry into the input interface 11, the error correction by the signal processor circuit 12 and data delivery from the host interface 13 are performed concurrently upon data of different blocks. An access to the buffer RAM 7 is enabled depending on the operational situations of the input interface 11, the signal processor circuit 12 and the host interface 13. The input interface 11, the signal processor circuit 12, the host interface 13 and the memory control circuit 14 operate in synchronism with a given clock signal.

Because a relatively large capacity of data is stored in the buffer RAM 7, including a plurality of blocks of data and TOC data, it is preferred to use a DRAM. A DRAM requires a refresh operation to maintain stored data. The memory control circuit 14 controls the supply of a row address strobe (RAS) and a column address strobe (CAS) to the buffer RAM 7 in order to perform a refresh operation.

The microcomputer interface 15 receives commands from the control microcomputer 8 and distributes such commands while providing status information to the control microcomputer 8.

A portable personal computer has a sleep mode which periodically interrupts information processing. However, it is necessary that TOC data including CD-ROM index data be stored in the buffer RAM 7 since otherwise, it is necessary to re-read the TOC data from the CD-ROM upon termination of the sleep mode, thus lengthening the data read time interval.

To maintain the TOC data stored in the buffer RAM 7 during the sleep mode, a refresh operation with a given period such as 512 cycles/8 milliseconds or 256 cycles/8 milliseconds is required. As shown in FIG. 3, a refresh signal generator circuit 24 uses a reference clock signal supplied from a phase locked loop (PLL) circuit 23 of a reference clock generator circuit 20 to form signals such as RAS and CAS which are used for the refresh operation, and provides these signals to the buffer RAM 7. It will be noted that the reference clock signal is generated from the duty cycle control of the PLL circuit 23 which utilizes a reference clock produced by the combination of a crystal oscillator 21 and an inverter 22 as well as a frequency converter. Accordingly, the reference clock generator circuit 20 cannot cease its operation during the sleep mode. The reference clock signal is produced by the oscillation of the crystal oscillator 21, which dissipates a relatively large amount of power. A current required for the refresh operation of the buffer RAM 7 increases in proportion to the capacity of the DRAM. Accordingly, the power consumption is not efficiently reduced during the sleep mode.

SUMMARY OF THE INVENTION

It is an object of the present invention to provide an optical disc player having a reduced power consumption during a sleep mode.

In one aspect of the present invention, a control apparatus for an optical disc player having an active mode and a sleep mode is provided. The optical disc player includes a first memory circuit for storing first data read from an optical disc, and a data processor circuit for performing a predetermined processing operation on the first data. The first memory circuit performs a refresh operation in order to maintain the first data stored therein. The control apparatus includes a second memory circuit for storing part of the first data and/or second data read from the optical disc. A circuit inhibits the refresh operation for the first memory circuit and maintains the data stored in the second memory circuit during the sleep mode.

In another aspect of the present invention, a control apparatus for an optical disc player including a first processor circuit and a second processor circuit is provided. The first processor circuit has a first memory for storing data read from an optical disc and which does not require a refresh, a first signal processor for reading the data from the first memory and performing a first predetermined processing operation on the read data to produce first processed data, a second memory for temporary storing the first processed data and which requires a refresh. The second processor includes a second signal processor for reading the first processed data from the second memory and performing a second predetermined processing operation on the first processed data. The control apparatus includes a control circuit which causes predetermined data stored in the second memory to be transferred to the first memory before the optical disk player enters a sleep mode and transfers the predetermined data stored in the first memory to the second memory upon termination of the sleep mode.

In yet another aspect of the present invention, a refresh circuit for refreshing a dynamic RAM is provided. The refresh circuit includes a reference clock generator providing an oscillation of a reference clock and producing a reference clock signal having a predetermined frequency using the reference clock. In a sleep mode, the reference clock generator circuit stops the oscillation of the reference clock in response to a stop signal and provides a sleep mode clock signal having a frequency which is required to refresh the dynamic RAM. A refresh signal generator is connected to the reference clock generator to generates a refresh signal for the dynamic RAM using the sleep mode clock signal.

In another aspect of the present invention, an optical disc player is provided. The player includes a buffer RAM for storing index information recorded on an optical disc and a refresh circuit for refreshing the buffer RAM. The refresh circuit includes a reference clock generator providing an oscillation of a reference clock and producing a reference clock signal having a predetermined frequency using the reference clock. The reference clock generator stops the oscillation of the clock signal in accordance with a stop signal during a sleep mode and produces a sleep mode clock signal having a frequency which is necessary to refresh the buffer RAM. A refresh signal generator circuit is connected to the reference clock generator to produce a refresh signal for the buffer RAM using the sleep mode clock signal. A control circuit is connected to the refresh circuit to produce the stop signal in accordance with a sleep command and deactivate the stop signal in accordance with a recovery command which terminates the sleep command.

Other aspects and advantages of the invention will become apparent from the following description, taken in conjunction with the accompanying drawings, illustrating by way of examples the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
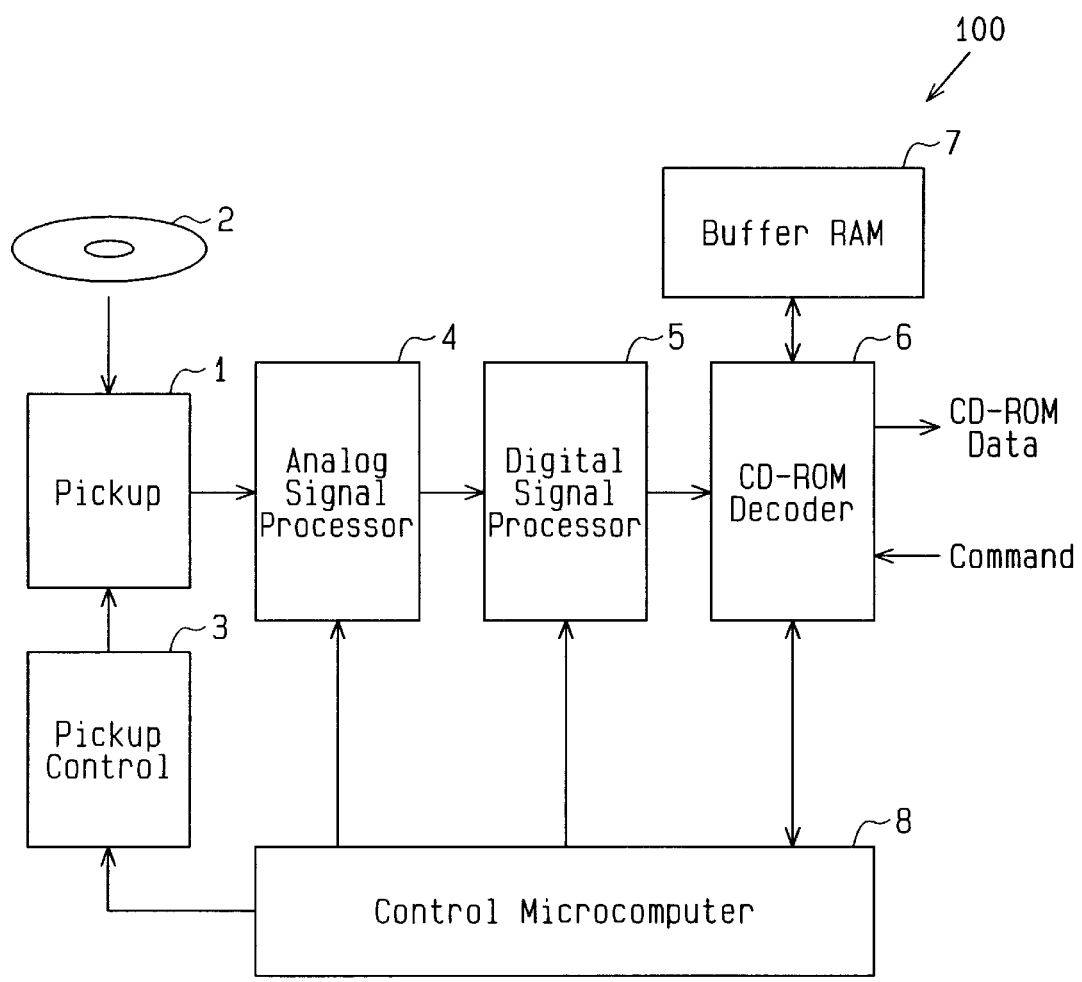
FIG. 1 is a schematic block diagram of a conventional optical disc player.

In the drawings, like numerals are used for like elements throughout.

Figure 2:
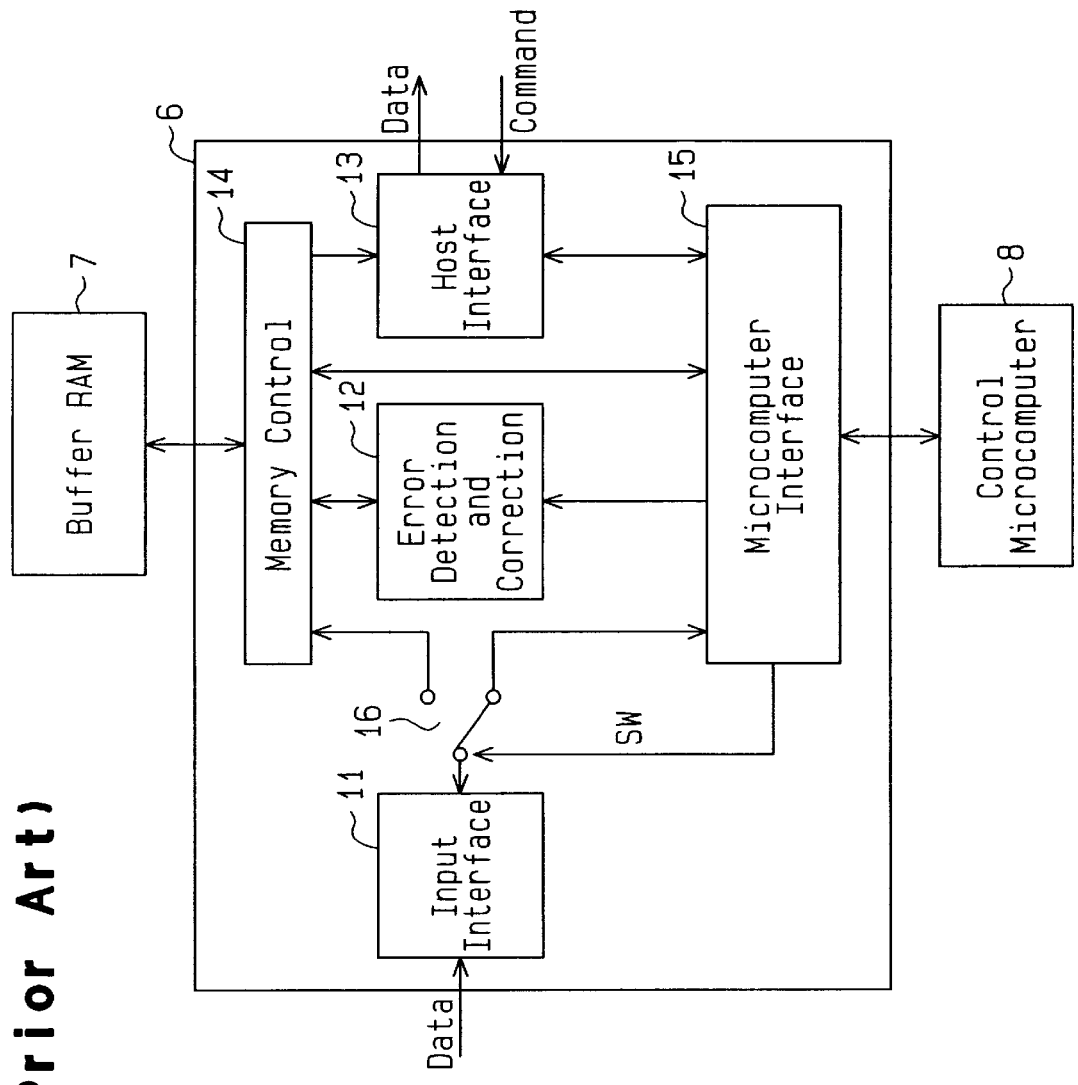
FIG. 2 is a schematic block diagram of a CD-ROM decoder of the optical disc player of FIG. 1.
Figure 3:
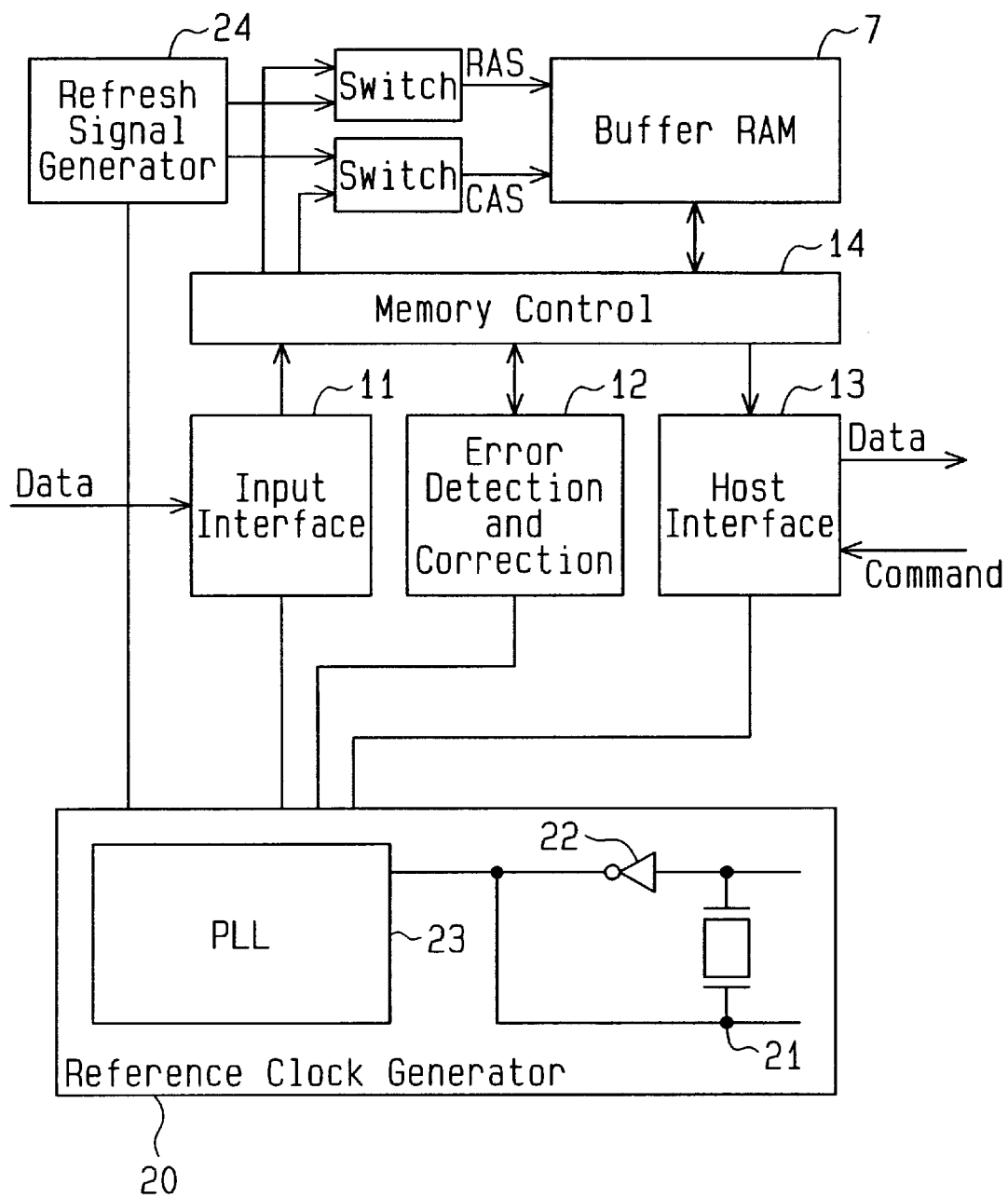
FIG. 3 is a schematic block diagram of a prior art reference clock generator circuit and refresh signal generator circuit.
Figure 4:
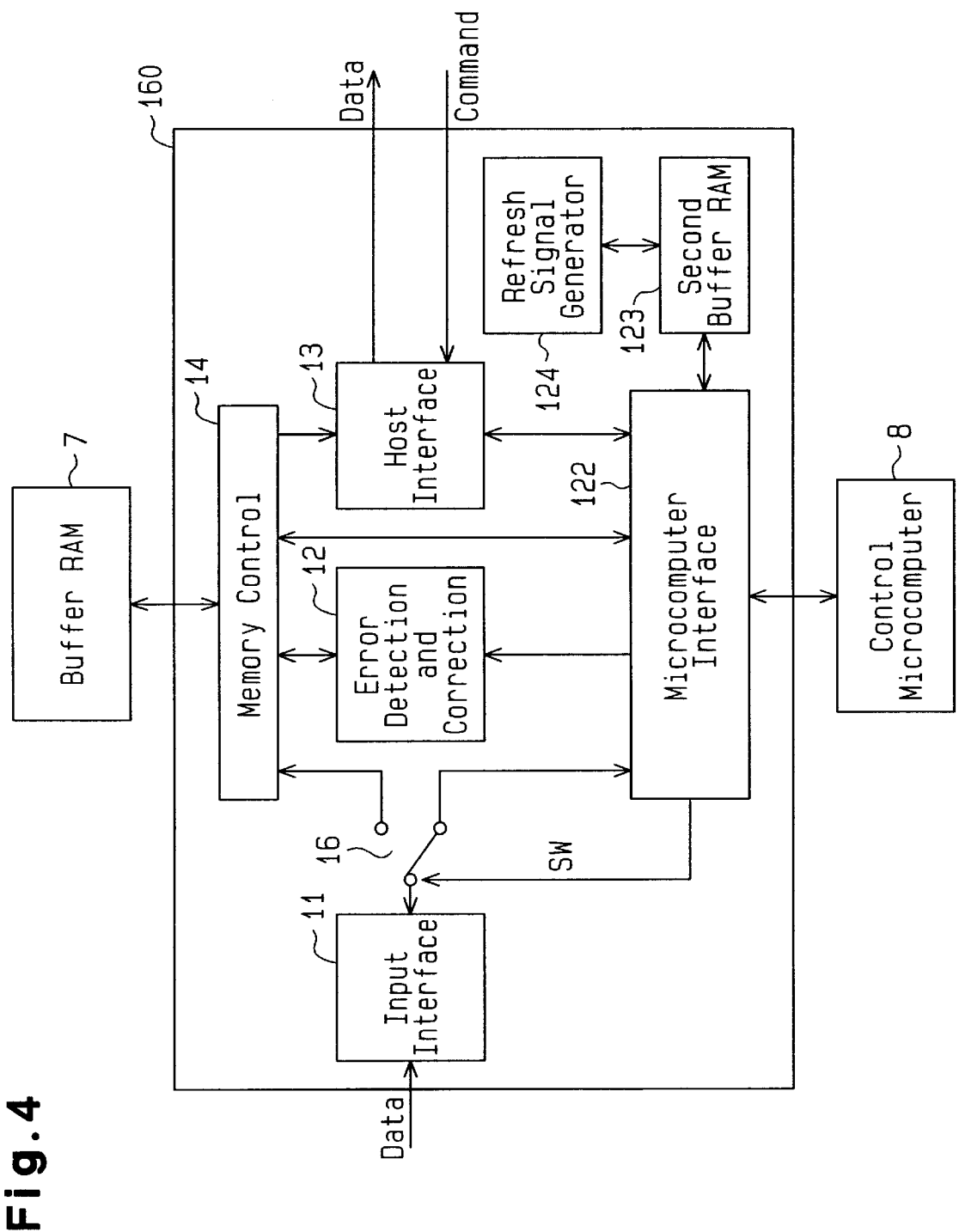
FIG. 4 is a schematic block diagram of an optical disc player according to a first embodiment of the present invention.

FIG. 4 is a schematic block diagram of a CD-ROM decoder 160 used in an optical disc player according to a first embodiment of the present invention. The CD-ROM decoder 160 comprises an input interface 11, a signal processor circuit 12, a host interface 13, a memory control circuit 14 connected to a buffer RAM 7, a microcomputer interface 122, a second buffer RAM 123 and a refresh signal generator circuit 124. The input interface 11, the signal processor circuit 12, and the host interface 13 are similar to those shown in FIG. 2, and therefore will not be specifically described.

The CD-ROM decoder 160 of the first embodiment differs from the conventional CD-ROM decoder 6 in that the second buffer RAM 123 and the refresh signal generator circuit 124 are provided. The second buffer RAM 123 is a DRAM having a capacity (on the order of about 1 k to 4 k bytes) for storing TOC data. The refresh signal generator circuit 124 generates a refresh signal which is used to refresh the second buffer RAM 123.

The second buffer RAM 123 stores data such as TOC data which is used or which may be likely to be used upon termination of the sleep mode. Accordingly, while data which is stored in the buffer RAM 7 may be lost during the sleep mode, the TOC data is maintained in the second buffer RAM 123 by the refresh operation. In this manner, power consumption can be reduced without erasing necessary data.

When a CD-ROM disc 2 is mounted on the optical disc player, the control microcomputer 8 delivers a command which causes the pickup control circuit 3 to read the TOC data which is recorded along the innermost periphery of the disc 2. The control microcomputer 8 then delivers a switch signal SW high to move the switch 16 to the microcomputer interface 122. A group of TOC data which is read from the disc 2 in three identical TOC data units are provided via the microcomputer interface 122 to the control microcomputer 8 and to the second buffer RAM 123 where one of the TOC data items in the group is stored. Alternatively, each item of the TOC data group may be temporarily stored in the second buffer RAM 123, and then two items in the group may be erased. When the entire TOC data group is read, and the TOC data is stored in the second buffer RAM 123, the control microcomputer 8 delivers a switch signal SW low to move the switch 16 to the memory control circuit 14. Although, the switch 16 is described like an electromechanical switch, it will be understood that the switch 16 may be an electronic switch, such as a transistor Subsequently, in response to a command from the host computer, CD-ROM data is read once and stored in the buffer RAM 7, decoded by the signal processor circuit 12, and then provided via the host interface 13 to the host computer.

Since access to the buffer RAM 7 takes place frequently, stored content may be maintained by a write/read operation during an active mode without a refresh operation. In contrast, access to the second buffer RAM 123 takes place less frequently, and accordingly a refresh signal is supplied to the second buffer RAM 123 from the refresh signal generator circuit 124 during the active mode.

The operation of the CD-ROM decoder 160 when switching from the active mode to the sleep mode will now be described. When a sleep command is provided from the host computer via the host interface 13 and the microcomputer interface 122 to the control computer 8, the control computer 8 ceases the operation of the input interface 11, the error detection circuit 12, the host interface 13, and the memory control circuit 14.

When the memory control circuit 14 ceases to operate, no refresh operation takes place with respect to the buffer RAM 7, whereupon data stored in the buffer RAM 7 is erased. The second buffer RAM 123 continues to be subject to a refresh operation even during the sleep mode in response to a refresh signal from the refresh signal generator circuit 124. Accordingly, the TOC data stored in the second buffer RAM 123 is maintained. Upon termination of the sleep mode, the TOC data stored in the second buffer RAM 123 is used to immediately initiate reading of data from the disc 2.

Advantages of the first embodiment are given below.

(1) The power consumption during the sleep mode is reduced in comparison to the prior art. If TOC data were written to the buffer RAM 7 at a given address as occurs in the prior art, there would be a need to perform a refresh operation on the buffer RAM 7 in order to maintain the TOC data during the sleep mode. Because the buffer RAM 7 has a capacity on the order of 1 megabyte, this refresh operation requires a relatively large amount of power. By contrast, the second buffer RAM 123 has a reduced capacity, as compared with the buffer RAM 7, which is on the order of 4 k bytes to be sufficient to store TOC data. Accordingly, the power required for the refresh operation of the second buffer RAM 123 is far less than the power required for the refresh operation of the buffer RAM 7.

(2) An operational load on the memory control circuit 14 is reduced. The buffer RAM 7, which is a DRAM, cannot perform a write operation and a read operation simultaneously. The memory control circuit 14 allows an access to the buffer RAM 7 by the input buffer 11, the error detection circuit 12 and the host interface 13 selectively or in a sequence of descending priority. In the first embodiment, the independent provision of the second buffer RAM 123 allows the number of accesses to the buffer RAM 7 to be reduced, thus reducing a load on the memory control circuit 14. In this manner, the processing operations take place smoothly. It will be also noted that access of the TOC data may be performed as required without being influenced by other processing operations.

Figure 5:
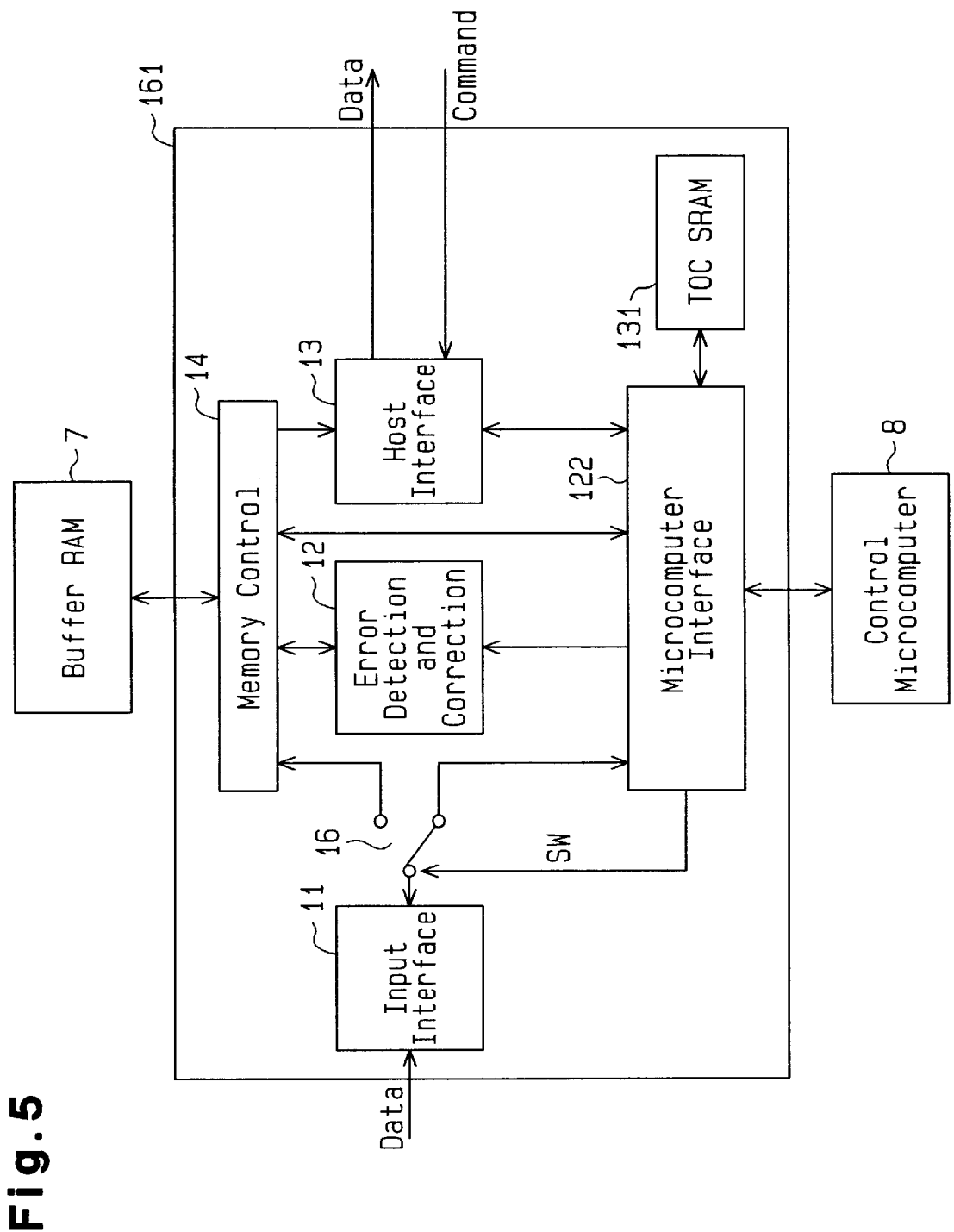
FIG. 5 is a schematic block diagram of an optical disc player according to a second embodiment of the present invention.

FIG. 5 is a schematic block diagram of CD-ROM decoder 161 according to a second embodiment of the present invention. In the second embodiment, there is provided a TOC data static random access memory (SRAM) 131, which requires a greater circuit area than DRAM, but achieves a higher operational speed and dispenses with the need for a refresh operation. Thus, no refresh signal generator circuit 124 is provided in the second embodiment.

The use of the SRAM 131 completely avoids the need of a refresh operation during the sleep mode. In other words, the clock signal no longer needs to be generated. This means that no power consumption occurs due to the oscillation of a crystal oscillator which would be required to generate a clock signal. In this manner, the power consumption during the sleep mode is drastically reduced.

Figure 6:
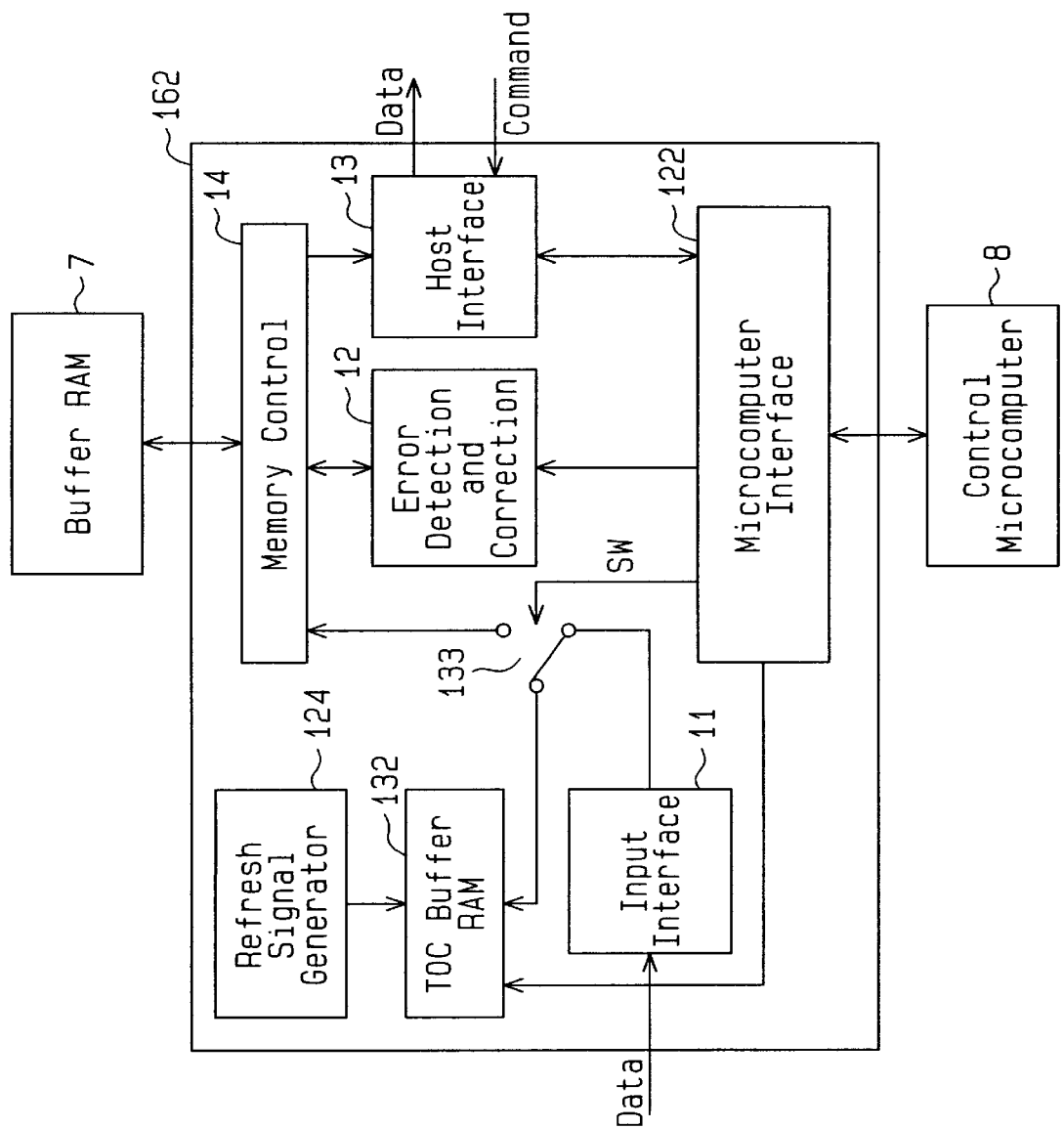
FIG. 6 is a schematic block diagram of an optical disc player according to a third embodiment of the present invention.

FIG. 6 is a schematic block diagram of CD-ROM decoder 162 according to a third embodiment of the present invention. In the third embodiment, a TOC data buffer RAM 132 is provided which directly stores TOC data that is supplied from the input interface 11.

When reading the TOC data, the control microcomputer 8 delivers a switching signal SW to move a switch 133 to the TOC data buffer RAM 132, whereupon TOC data can be written into the TOC data buffer RAM 132. The write control to the buffer RAM 132 takes place by the control microcomputer 8. The deletion of two unnecessary TOC data items in the TOC data group stored in the buffer RAM 132 may be performed by the control microcomputer 8. In the third embodiment, the TOC data buffer RAM 132 may be replaced by a SRAM. In this instance, there is no need for the refresh signal generator circuit 124.

Figure 7:
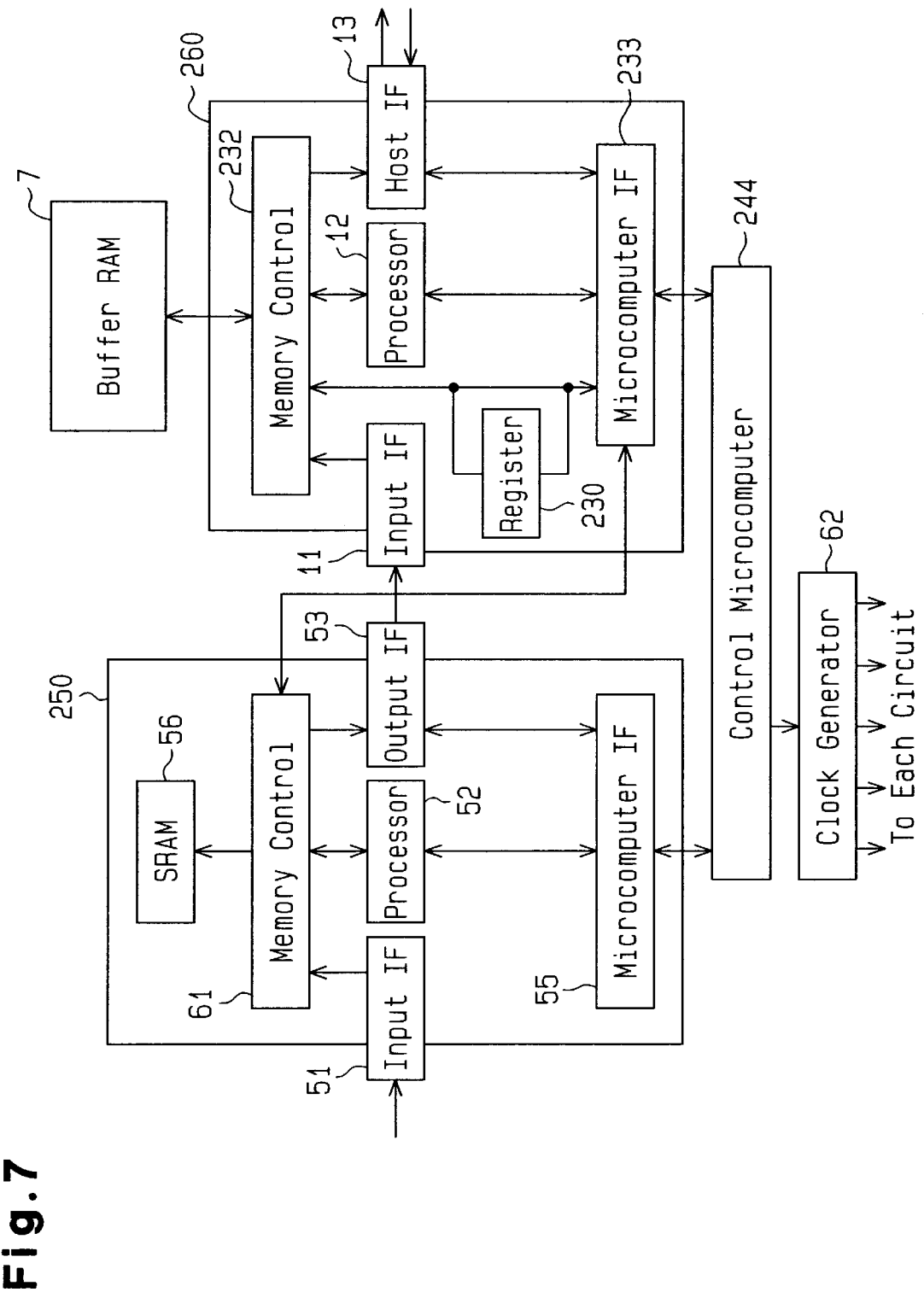
FIG. 7 is a schematic block diagram of an optical disc player according to a fourth embodiment of the present invention.

FIG. 7 is a schematic block diagram of a digital signal processor circuit 250 and CD-ROM decoder 260 used in an optical disc player according to a fourth embodiment of the present invention. The digital signal processor circuit 250 comprises an input interface 51, a signal processor circuit 52, an output interface 53, a memory control circuit 61, a microcomputer interface 55 and an SRAM 56. The CD-ROM decoder 260 comprises an input interface 11, a signal processor circuit 12, a host interface 13, an address register 230 which preferably comprises a flip-flop, a memory control circuit 232 and a microcomputer interface 233.

In the fourth embodiment, a first address (head address) of the TOC data which is stored in the buffer RAM 7 (DRAM) and size data (for example, representing 2735 bytes) for the TOC data are stored in the address register 230. A given address is chosen as the first address and the TOC data is stored in the buffer RAM 7 in accordance with addresses which continue from the first address. The microcomputer interface 233 is connected with the memory control circuits 61 and 232.

EFM data which is supplied from the analog signal processing unit 4 to the input interface 51 is stored in the SRAM 56 under the control of the memory control circuit 61. The signal control circuit 62 reads the EFM data from SRAM 56, and demodulates it to produce CD-ROM data having a format of 24 bytes per frame. After the CD-ROM data is produced, the next EFM data is written to the SRAM 56. The CD-ROM data is provided via the output interface 53 to the input interface 11 of the CD-ROM decoder 260. The EFM data has a size which is not so large, and because the demodulation takes place simultaneously with the data read, an SRAM capable of high speed operation is used. The memory control circuit 61 is connected with the input interface 51, the signal processor circuit 52 and the output interface 53 for controlling the delivery and transfer of the EFM data and the CD-ROM data between the input interface 51, the signal processor 52, the output interface 53 and the SRAM 56.

Entry into the sleep mode will now be described. When a sleep command is issued from the host computer to the host interface 13, it is transferred via the microcomputer interface 233 to the control microcomputer 244, which responds by delivering a TOC transfer command to the memory control circuit 232 via the microcomputer interface 233. On the basis of the first address and the size data stored in the address register 230, the memory control circuit 232 reads the TOC data from the buffer RAM 7, and transfers it to the microcomputer interface 233, where a part of the TOC data is temporarily stored in a register (not shown). The memory control circuit 61 reads the TOC data stored in the register of the microcomputer interface 233, and writes it to the SRAM 56 in a sequential manner beginning with the first address. A succeeding portion of the TOC data continues to be written to a storage region of the SDRAM 56 for which the write operation has been completed. After the write operation of the TOC data into the SDRAM 56 is completed, the control microcomputer 244 delivers a stop command to the clock generator circuit 62, which then stops to generating the clock signal, thus entering the sleep mode.

Recovery to a normal operational mode from the sleep mode will now be described. When a recovery command to the normal operational mode is supplied from the host computer to the microcomputer interface 233, the recovery command is transferred from the microcomputer interface 233 to the control microcomputer 244, which responds to the recovery command to deliver a stop termination command to the clock generating circuit 62, which in turn supplies a clock signal to the various circuits. In addition, the control microcomputer 244 delivers a TOC transfer command to the memory control circuit 61, which then reads the TOC data stored in the address register 230 from the SRAM 56 beginning with the first address, and writes such TOC data into the buffer RAM 7 via the microcomputer interface 233 and the memory control circuit 232.

It should be noted that data which is written to the SRAM 56 is not limited to TOC data, but may also include data which needs to be read again or are highly likely to be read upon recovery to the normal mode. Normal data is very unlikely to be read again upon recovery, and the need that it must be maintained during the sleep mode is low. Accordingly, the normal data is erased during the sleep mode, and is read from the disc 2 as required, upon recovery.

Advantages of the fourth embodiment are given below.

(1) TOC data is backed up by the SRAM 56 during the sleep mode. Accordingly, if the data stored in the buffer RAM 7 is erased during the sleep mode, the recovery time can be shortened using the TOC data backed up by the SRAM 56. The power consumption is reduced considerably since the generation of the clock signal is stopped during the sleep mode. In addition, the SRAM 56 is capable of maintaining the data with a power supply without using the clock signal. In other words, the SRAM 56 does not require a current in order to maintain the data. This reduces the power consumption during the sleep mode. The TOC data generally comprises 2735 bytes. Accordingly, the SRAM 56 has a capacity in excess of the TOC data, for example, a capacity of 2752 bytes. Because a capacity for EFM data is equal to 2112 bytes, for example, the SRAM 56 has a sufficient capacity to hold the EFM data.

(2) By applying the SRAM 56 in the digital signal processor circuit 250 for string TOC data during the sleep mode, there is no need for a separate SDRAM which is expensive, thus suppressing a cost increase. The SRAM 56 in the digital signal processor circuit 250 operates at a high speed, and thus is preferred for temporary storage of EFM data subject to processing. Thus, the fourth embodiment is implemented by paying attention to and utilizing the characteristic of SRAM which maintains stored data unless the power supply is interrupted, even if the generation of the clock signal is stopped.

(3) After the control microcomputer 244 has issued the sleep command and the recovery command, a data transfer for backup purpose of TOC data and for recovery from the sleep mode takes place without intervention of the processor circuits 52 and 12 and the control microcomputer 244.

Accordingly, the data transfer for the back-up purpose and for recovery is performed rapidly.

Figure 8:
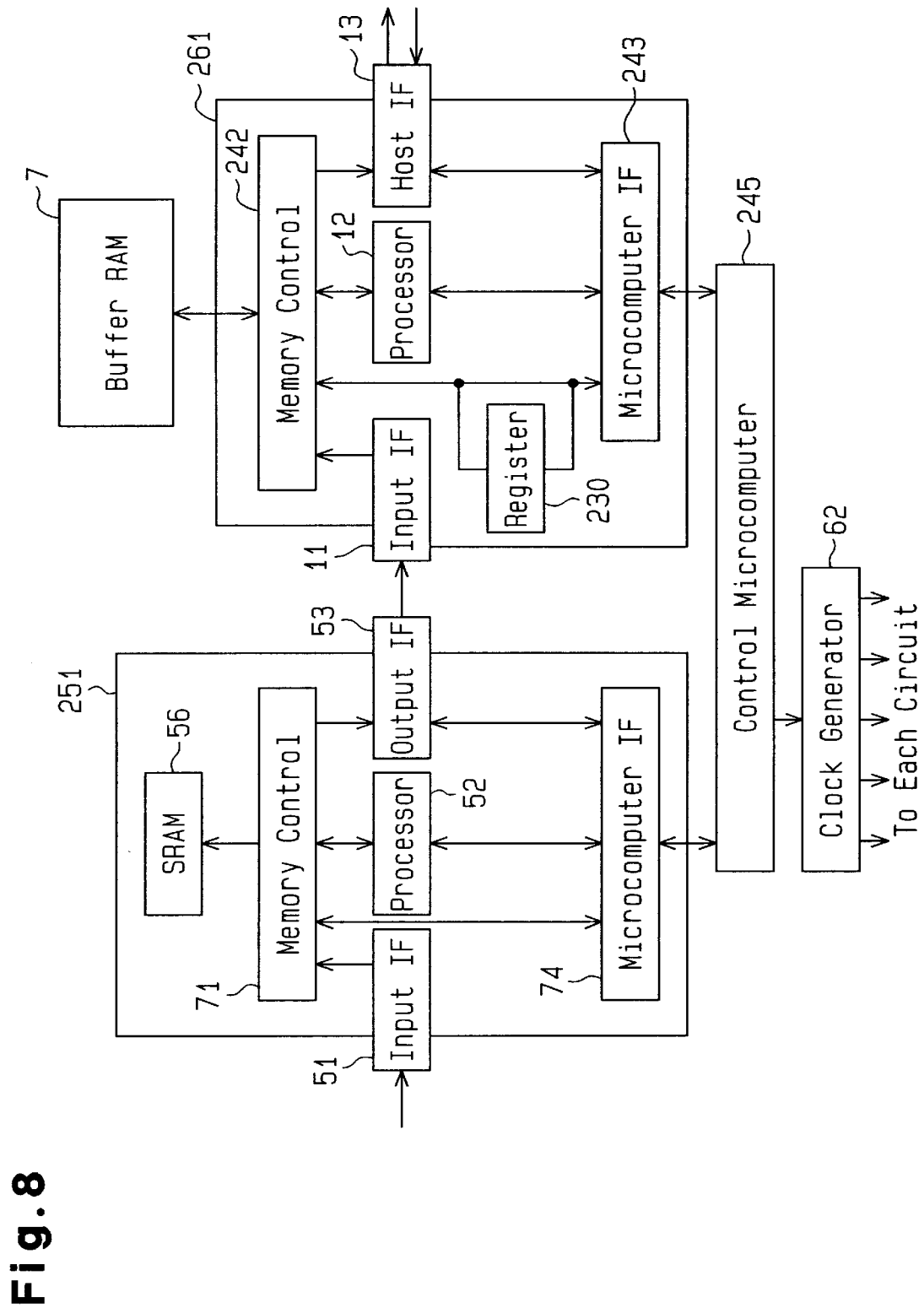
FIG. 8 is a schematic block diagram of an optical disc player according to a fifth embodiment of the present invention.

FIG. 8 is a schematic block diagram of a digital signal processor circuit 251 and CD-ROM decoder 261 according to a fifth embodiment of the present invention. In the fifth embodiment, a path which connects a microcomputer interface 74 and a memory control circuit 71 is provided. Accordingly, there is no direct path between a microcomputer interface 243 and a memory control circuit 71 as in the fourth embodiment. In the fifth embodiment, the TOC back-up transfer, when entering the sleep mode, is performed via the microcomputer interface 243, a control microcomputer 245 and the microcomputer interface 74.

When the sleep command is delivered from the host computer to the host interface 13, the sleep command is transferred via the microcomputer interface 243 to the control microcomputer 245, which delivers the TOC transfer command to the memory control circuit 242 via the microcomputer interface 243. The memory control circuit 242 in turn delivers the first address and the size data stored in the address register 230 to the microcomputer 243, which then transfers them to the control microcomputer 245. The control microcomputer 245 begins to read TOC data corresponding to the data size from the buffer RAM 7, beginning with at the first address, via the microcomputer interface 243 and the memory control circuit 242, and causes the read TOC data to be stored in the SRAM 56 via the microcomputer interface 74 and the memory control circuit 71.

Rather than using address information stored in the address register 230, the back-up may be performed by using a flag. In such instance, the address register 230 can be omitted. For example, a flag may be appended to the TOC data initially read from the disc 2, and the flagged TOC data is stored in the buffer RAM 7. When entering the sleep mode, a discrimination circuit discriminates between flagged TOC data and unflagged TOC data, before TOC data is backed up by the SRAM 56. The discrimination circuit is preferably provided in the control microcomputer 245. In this instance, when entering the sleep mode, the control microcomputer 245 discriminates the TOC data read from the buffer RAM 7 via the memory control circuit 242 and the microcomputer interface 243 and which is flagged to store it in the SRAM 56 via the microcomputer interface 74 and the memory control circuit 71.

Advantages of the fifth embodiment are given below.

(1) The fifth embodiment is preferred for use in an arrangement in which the digital signal processor circuit 251 and CD-ROM decoder 261 are formed on separate semiconductor chips. It will be noted that when a direct path is provided between the microcomputer interface 243 and the memory control circuit 71 as in the fourth embodiment, the number of connection pins increases. By contrast, in the fifth embodiment, the existing path which extends from the microcomputer interface 243 via the control microcomputer 245 to the microcomputer interface 74 can be utilized, thus preventing an increase in the number of pins.

(2) The fifth embodiment is preferred for use in an arrangement in which TOC data is stored in a plurality of storage regions in the buffer RAM 7. The memory control circuits 242, 71 and the microcomputer interface 243, 74 are controlled such that when the backup operation for a first portion of TOC data stored in a first storage region is completed, the backup operation for a second portion of TOC data stored in a second storage region is initiated. Accordingly, if TOC data is stored in a divided manner, a backup operation for data other than the TOC data is not performed, allowing the backup operation to take place selectively for TOC data.

Figure 9:
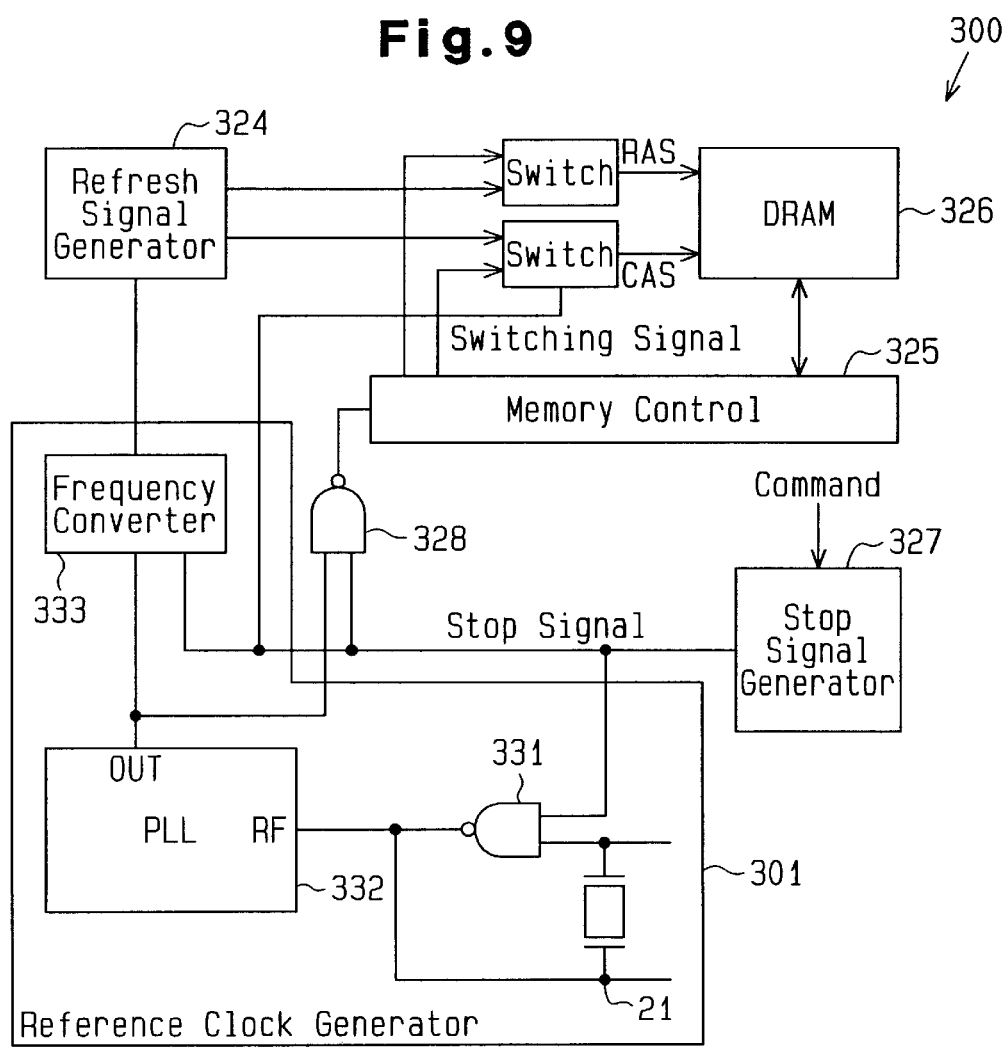
FIG. 9 is a schematic block diagram of a refresh circuit according to a sixth embodiment of the present invention.

FIG. 9 is a schematic block diagram of a refresh circuit 300 according to a sixth embodiment of the present invention. The refresh circuit 300 comprises a reference block generator circuit 301, a refresh signal generator circuit 324 and a stop signal generator circuit 327.

The reference clock generator circuit 301 includes a crystal oscillator 21, a NAND gate 331 and a frequency conversion circuit 333. The combination of the crystal oscillator 21 and the NAND gate 331 produces an oscillation of a reference clock RF, which is provided to a PLL circuit 332. The PLL circuit 332 produces a reference clock signal by a duty cycle conversion of pulses of the reference clock RF. The reference clock signal is provided via the NAND gate 328 to a memory control circuit 325.

The memory control circuit 325 is connected to a DRAM 326, and controls a write/read operation thereof. The memory control circuit 325 delivers RAS and CAS signals when accessing the DRAM 326, and the RAS and CAS signals initiate a refresh operation of the DRAM 326.

Figure 10:
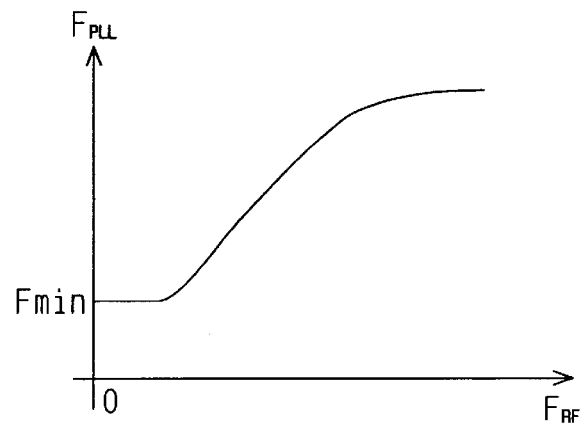
FIG. 10 is a graph showing a relationship between reference clock frequency and an output frequency in the PLL circuit of the refresh circuit of FIG. 9.

The PLL circuit 332 has an output frequency $F_{PLL}$ which changes with respect to the frequency $F_{RF}$ of the reference clock in a manner graphically shown in FIG. 10. Specifically, as long as the frequency $F_{RF}$ of the reference clock RF remains in a given frequency range, the circuit 332 delivers a frequency $F_{PLL}$ which is proportional to the frequency $F_{RF}$. For the frequency $F_{RF}$ which is below a given value, the frequency $F_{PLL}$ assumes a minimum frequency $F_{min}$ by a self-oscillation.

The stop signal generator circuit 327 receives a sleep command from an external circuit, not shown, and responds to the sleep command by delivering a low active stop signal. The stop signal is provided to the NAND gate 331, with the consequence that the crystal oscillator 21 ceases its oscillating operation and stops the generation of the reference clock. The stopping of generating the reference clock is equivalent to supplying the reference clock RF of 0 Hz to the PLL circuit 332. Accordingly, the PLL circuit 332 begins its self-oscillation at the minimum frequency $F_{min}$. The minimum frequency varies depending on the thermal environment in which the PLL circuit 332 operates as well as a variation caused during the manufacture, but remains in a region from about 60 MHZ to 90 MHZ in the sixth embodiment.

The stop signal is also provided to the NAND gate 328, with consequence that the supply of the reference clock signal to the memory control circuit 325 is interrupted, whereby the memory control circuit 325 ceases its operation.

Additionally, the stop signal is provided to the frequency conversion circuit 333. The frequency conversion circuit 333 converts the frequency of the clock signal which is delivered from the PLL circuit 332, as long as the stop signal is supplied thereto. Thus, during the sleep mode, the frequency conversion circuit 333 converts the minimum frequency $F_{min}$ of the clock signal which is delivered from the PLL circuit 332 and generates the sleep mode clock signal.

The refresh signal generator circuit 324 produces the RAS and CAS signals which are used for the refresh operation of DRAM 326 using the sleep mode clock signal.

The frequency conversion circuit 333 converts the minimum frequency from the PLL circuit 332 to a frequency which is required to perform the refresh operation of the DRAM 326. For example, where the DRAM 326 must be refreshed at a minimum rate of 512 cycles/8 milliseconds, a frequency which assures a reliable refresh operation of the DRAM 326 can be obtained by dividing the minimum frequency $F_{min}$ from the PLL circuit 332 by a value equal to {8 (ms)/512 (cycles)}×Fmin. Assuming that the frequency Fmin is equal to 60 MHZ, the minimum frequency $F_{min}$ may be divided by 937 to provide a clock signal which enables a refresh operation. Where the DRAM 326 must be refreshed at a rate of 256 cycles/8 milliseconds, the minimum frequency $F_{min}$ may be divided by 1874. Refreshing the DRAM 326 at a rate above 512 cycles/8 milliseconds or 256 cycles/8 milliseconds presents no problem, but a refresh operation with a rapid period increases the power consumption, and accordingly, it is desirable that a value of a divisor close to 937 or 1874 be used.

The frequency of the self-oscillation depends on a variation in the operational environment, and does not always remain stable. However, it is required that DRAM 326 be refreshed 256 cycles, for example, during an interval of 8 milliseconds, and it is not required that the refresh period be stable. The minimum frequency from the PLL circuit 332 varies in a direction to refresh the DRAM 326 more rapidly depending on a temperature change or a variation in the manufacture from product to product. Accordingly, by determining a value of the divider on the basis of a minimum value in the fluctuation of the minimum frequency $F_{min}$ (which is equal to 60 MHZ in the present example), a refresh operation is assured using a clock signal which is obtained by the frequency conversion.

In the refresh circuit 301 of the sixth embodiment, when the sleep command is issued, the crystal oscillator 21 ceases its operation, and the self-oscillation of the PLL circuit 332 provides the sleep mode clock signal, the frequency of which is converted into a frequency which enables a refresh operation of the DRAM 326. Accordingly, the fact that the crystal oscillator 21 ceases its operation during the sleep mode reduces the power consumption during the sleep mode.

When a recovery command which requires the termination of the sleep mode and the recovery to the normal operation is issued to the stop signal generator circuit 327, the stop signal generator circuit 327 then delivers a stop signal of a high level, which is effective to activate the crystal oscillator 21 to cause an oscillation of the reference clock, thus re-entering the normal mode.

FIG. 11(a) is a schematic block diagram of a refresh circuit 303 according to a seventh embodiment of the present invention. In the seventh embodiment, a stop signal is provided to a PLL circuit 339 of a reference clock generator circuit 302, and no frequency conversion circuit is provided.

When a stop signal generator circuit 327 produces a stop signal in accordance with a sleep command, the crystal oscillator 21 ceases its operation, thus ceasing to feed the clock signal to a memory control circuit 325.

In response to the stop signal, the PLL circuit 339 produces a sleep mode clock signal having a frequency which enables a refresh operation of the DRAM 326. FIG. 11(b) is a schematic block diagram of the PLL circuit 339. The PLL circuit 339 comprises a phase detector 341, a charge pump 342, a low pass filter 343, a voltage controlled oscillator (VCO) 344, a frequency divider 345 and a switch 346. The phase detector 341, the charge pump 342, the low pass filter 343, the VCO 344 and the frequency divider 345 together form a PLL, which provides a phase locked clock signal. The phase detector 341 compares the phase of the reference clock against the phase of a feedback clock to produce an output voltage which depends on a phase difference therebetween. The VCO 344 produces an oscillation frequency signal which depends on an output voltage from the low pas filter 343.

It is a feature of the PLL circuit 339 of the seventh embodiment that a voltage $V_{SLEEP}$ is provided from a power supply 347 to the input of VCO 344 via the switch 346 which is made conductive in response to the stop signal.

When the crystal oscillator 21 ceases its operation in response to the stop signal and the reference clock is no longer input to the phase detector 341, the phase detector 341 delivers 0V. However, the switch 346 is rendered conductive in response to the stop signal to feed the voltage $V_{SLEEP}$ from the power supply 347 to VCO 344. The voltage $V_{SLEEP}$ is chosen such that a sleep mode clock signal having a refresh period for the DRAM 326 (namely, either 512 cycles/8 milliseconds 256 cycles/8 milliseconds) is delivered from the PLL circuit 339. Accordingly, when the sleep command causes the crystal oscillator 21 to cease its operation, the PLL circuit 339 produces the sleep mode clock signal, which is used to provide the refresh operation for the DRAM 326. No problem is presented if the refresh operation is performed with a more rapid period than mentioned above, but a refresh operation with a more rapid period increases the power consumption.

Figure 12:
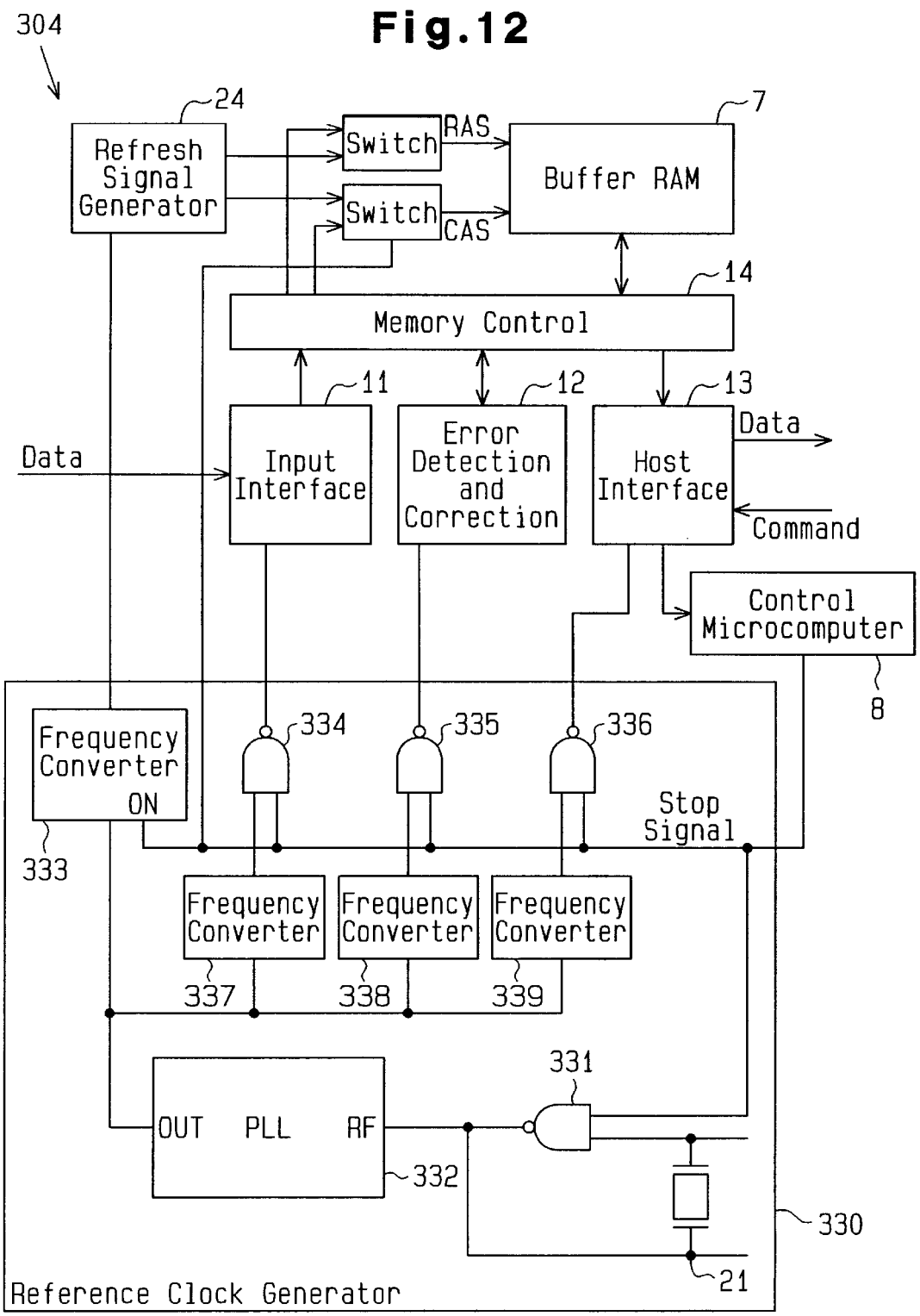
FIG. 12 is a schematic block diagram of an optical disc player according to an eighth embodiment of the present invention.

FIG. 12 is a schematic block diagram of a refresh circuit 304 which is preferred for use with an optical disc player according to an eighth embodiment of the present invention.

A reference clock generator circuit 330 comprises a crystal oscillator 21, a NAND gate 331, a PLL circuit 332 and a frequency conversion circuit 333. A reference clock is produced by the combination of the crystal oscillator 21 and the NAND gate 331, and is subject to a duty cycle conversion and a frequency conversion in the PLL circuit 332 to provide a reference clock signal for the input interface 11, the signal processor 12 and the host interface 13 and a refresh signal generator circuit 24. NAND gates 334, 335, 336 and frequency converters 337, 338, 339 are provided between the input interface 11, the signal processor 12 and the host interface 13 and the PLL circuit 332. The frequency converters 337 to 339 perform frequency conversion of the clock signal to generate frequency converted clock signal suitable for the input interface 11, the signal processor circuit 12, and the host interface 13.

When the sleep command is issued from the host computer to the host interface 13, the host interface 13 transfers it to the control microcomputer 8, which then produces a stop signal. The stop signal is provided to the NAND gates 331, 334, 335 and 336. The stop signal is also provided to the pickup 1, the pickup control circuit 3, the analog signal processor circuit 4, and the digital signal processor circuit 5, all of which cease their operations. The control microcomputer 8 continues to deliver the stop signal until a sleep terminate command is issued from the host computer. The control microcomputer 8 serves as the stop signal generator circuit 327 shown in the sixth and the seventh embodiments.

When the stop signal is provided to the NAND gate 331, the crystal oscillator 21 ceases its oscillation, whereby the supply of the reference clock to the PLL circuit 332 is interrupted. In response to the interruption of the oscillation of the crystal oscillator 21, the output frequency of the PLL circuit 332 is reduced to the minimum frequency $F_{min}$ which is provided by the self-oscillation, which lies in a region from about 60 MHz to 90 MHZ.

The frequency conversion circuit 333 operates during the time the stop signal is supplied thereto, providing a frequency conversion of the minimum frequency $F_{min}$ from the PLL circuit 332 to provide the sleep mode clock. The refresh signal generator circuit 24 produces RAS and CAS signals in accordance with the sleep mode clock, thus allowing a refresh operation for the buffer RAM 7 during the sleep mode.

When the stop signal is provided to the NAND gates 335, 334 and 336, the reference clock signal ceases to be provided to the input interface 11, the signal processor circuit 12 and the host interface 13, such that they cease their operations.

In the refresh circuit 304, the sleep command causes the crystal oscillator 21 to cease its oscillation, while the sleep mode clock is produced using the steady-state oscillation frequency $F_{min}$ of the PLL circuit 332 and the sleep mode clock is used to provide a refresh operation for the buffer RAM 7. In this manner, the power consumption is reduced during the sleep mode.

When the sleep mode is terminated, the recovery command is provided via the host interface 13 to the control microcomputer 8, which then ceases to provide the stop signal in accordance with the recovery command, whereby the frequency conversion circuit 333 ceases to operate, allowing the PLL circuit 332 to generate the reference clock signal.

Figure 11:
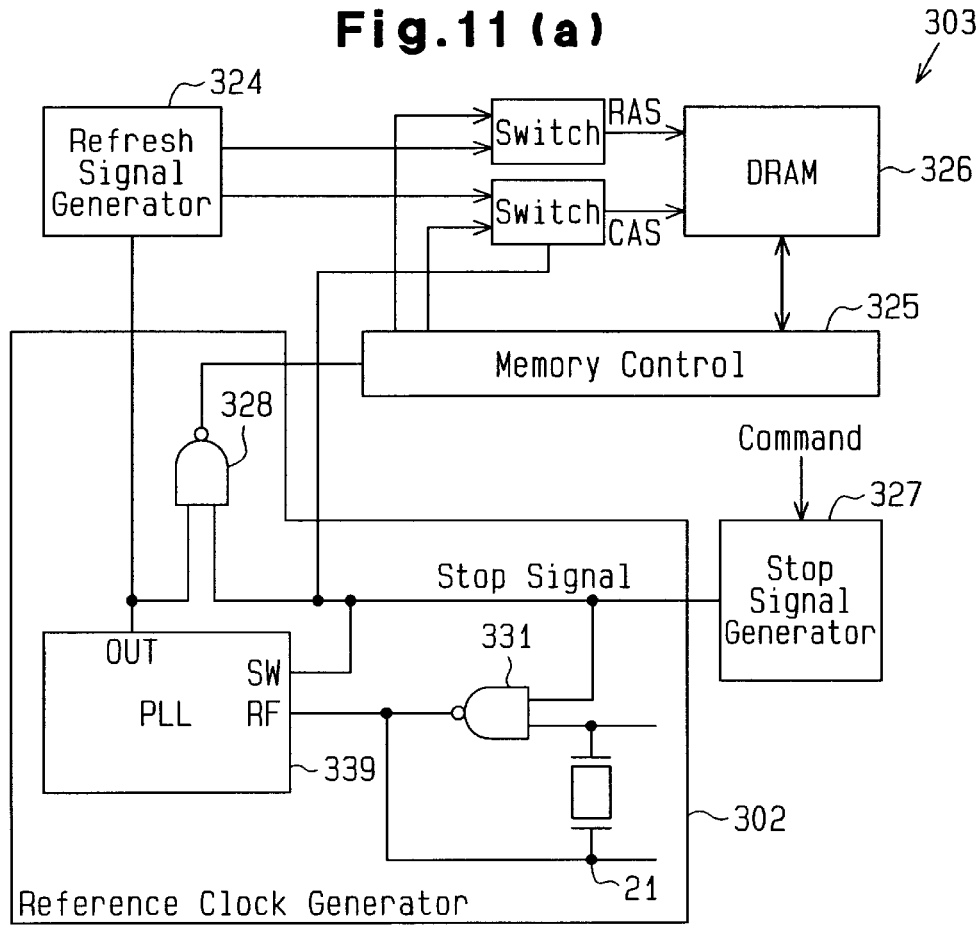
FIG. 11(a) is a schematic block diagram of a refresh circuit of a seventh embodiment of the present invention.
FIG. 11(b) is a schematic block diagram of the PLL circuit for the refresh circuit of FIG. 11(a)
Figure 11:
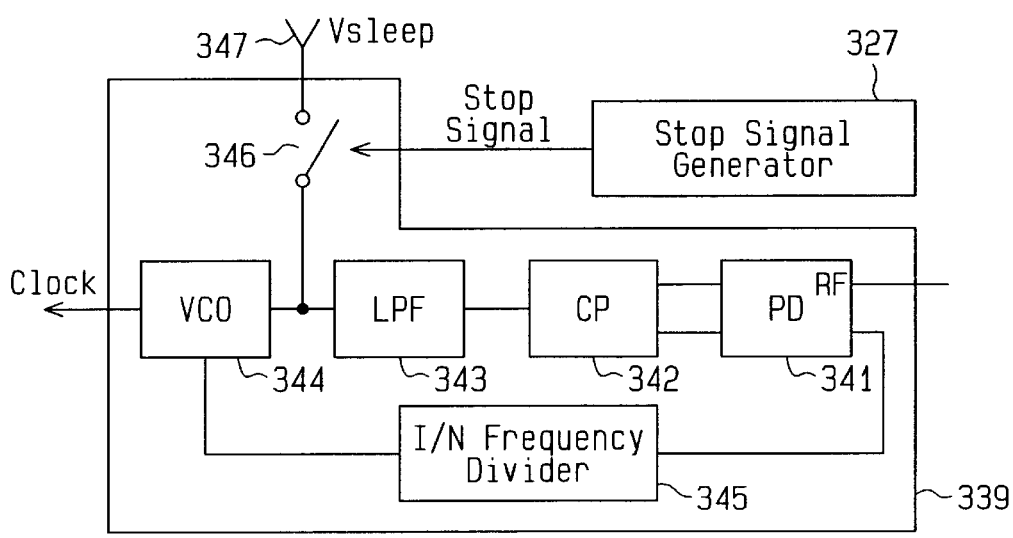
Figure 13:
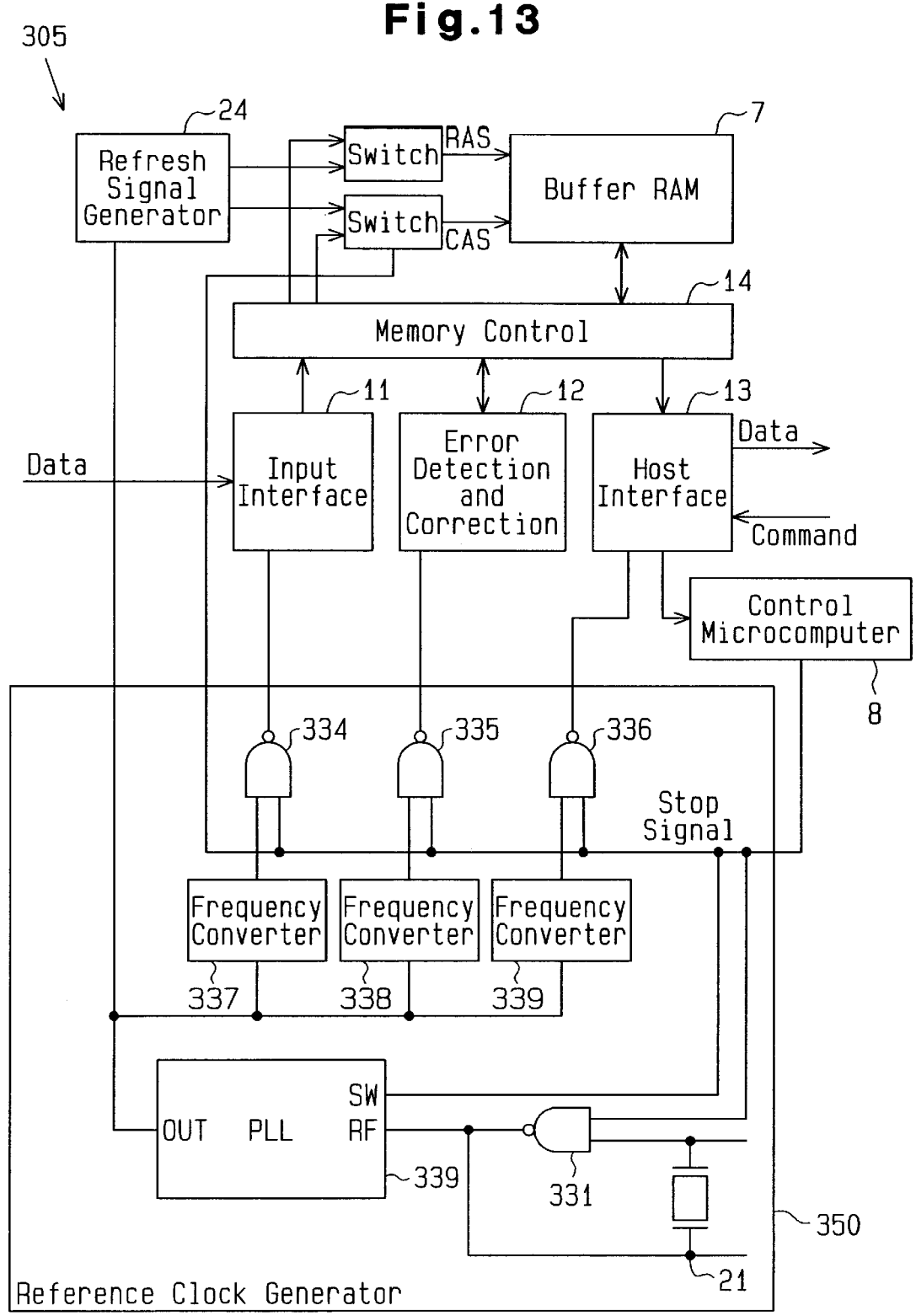
FIG. 13 is a schematic block diagram of an optical disc player according to a ninth embodiment of the present invention.

FIG. 13 is a schematic block diagram of a refresh circuit 305 preferred for use with an optical disc player according to a ninth embodiment of the present invention. The refresh circuit 305 of the ninth embodiment includes a reference clock generator circuit 350 which is similar to the reference clock generator circuit 302 of the seventh embodiment (FIG. 11).

The reference clock generator circuit 350 comprises a crystal oscillator 21, a NAND gate 331 and a PLL circuit 339. A reference clock signal produced by the PLL circuit 339 is provided via NAND gates 334, 335 and 336 to the input interface 11, the signal processor 12 and the host interface 13 and the refresh signal generator circuit 24.

When the sleep command is issued from the host computer to the host interface 13, the control microcomputer 8 provides a stop signal to the NAND gate 331, whereby the crystal oscillator 21 ceases its oscillation and the supply of the reference clock signal from the PLL circuit 339 is interrupted.

When the stop signal is received by the PLL circuit 339, it generates a sleep mode clock signal to the refresh signal generator circuit 24. The refresh signal generator circuit 24 produces RAS and CAS signals in accordance with the sleep mode clock signal, enabling a refresh operation for the buffer RAM 7 during the sleep mode.

In the refresh circuit 305 of the ninth embodiment, the sleep command causes the crystal oscillator 21 to cease its oscillation while the PLL circuit 339 produces the sleep mode clock to provide a refresh operation for the buffer RAM 7. In this manner, the power consumption is reduced during the sleep mode.

The present invention has been implemented in a refresh circuit of an optical disc player during the sleep mode. However, the refresh circuit of the present invention can be effectively used when maintaining DRAM in its sleep or standby condition while maintaining data stored in the DRAM.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A control apparatus for an optical disc player including a first processor circuit having an interface circuit for receiving data read from an optical disc, the first processor circuit having a first memory for storing the data received by the interface circuit and which does not require a refresh, a first signal processor, coupled to the first memory, for reading the data from the first memory and performing a Cross Interleave Reed Solomon Code (CIRC) processing operation on the read data to produce first processed data, the first processed data including a table of contents (TOC), a second memory for temporary storing the first processed data and which requires a refresh, and a second processor including a second signal processor for reading the first processed data from the second memory and performing a predetermined processing operation on the first processed data, the control apparatus comprising:

a control circuit which causes the TOC stored in the second memory to be transferred to the first memory before the optical disk player enters a sleep mode and transfers the TOC stored in the first memory to the second memory upon termination of the sleep mode.

2. The control apparatus according to claim 1, further comprising a discrimination circuit for discriminating the TOC from the first processed data stored in the second memory and transferring the discriminated TOC to the first memory.

3. The control apparatus according to claim 1, wherein the TOC is consecutively stored in the second memory beginning at a predetermined address, the control circuit reading the TOC from the second memory at the predetermined address and transferring the read TOC to the first memory.

4. The control apparatus according to claim 1, wherein the control circuit includes:

a first memory control circuit for controlling the first memory; and a second memory control circuit for controlling the second memory, the first and the second control circuits being connected together to allow a transfer of the TOC.

5. The control apparatus according to claim 1, wherein the control circuit includes:

a first memory control circuit for controlling the first memory;

a second memory control circuit for controlling the second memory; and a main control circuit for controlling the first and the second memory control circuits, the TOC being transferred via the first and the second memory control circuits and the main control circuit.

6. A control apparatus for an optical disc player including a first processor circuit having an interface circuit for receiving eight to fourteen modulation (EFM) data read from an optical disc, a first memory for storing the EFM data received by the interface circuit in a normal operation mode and which does not require a refresh, a first signal processor for reading the data from the first memory and performing a first predetermined processing operation on the read data to produce first processed data, the first processed data including a table of contents (TOC), a second memory for temporary storing the first processed data and which requires a refresh, and a second processor including a second signal processor for reading the first processed data from the second memory and performing a second predetermined processing operation on the first processed data, the control apparatus comprising:

a control circuit which causes the TOC stored in the second memory to be transferred to the first memory before the optical disk player enters a sleep mode and transfers the TOC stored in the first memory to the second memory upon termination of the sleep mode.

7. The control apparatus according to claim 6, further comprising a discrimination circuit for discriminating the TOC from the first processed data stored in the second memory and transferring the discriminated TOC to the first memory.

8. The control apparatus according to claim 6, wherein the TOC is consecutively stored in the second memory beginning at a predetermined address, the control circuit reading the TOC from the second memory at the predetermined address and transferring the TOC to the first memory.

9. The control apparatus according to claim 6, wherein the control circuit includes:

a first memory control circuit for controlling the first memory; and a second memory control circuit for controlling the second memory, the first and the second control circuits being connected together to allow a transfer of the TOC.

10. The control apparatus according to claim 6, wherein the control circuit includes:

a first memory control circuit for controlling the first memory;

a second memory control circuit for controlling the second memory; and a main control circuit for controlling the first and the second memory control circuits, the TOC being transferred via the first and the second memory control circuits and the main control circuit.

11. A control apparatus for an optical disc player including an interface circuit for receiving data read from an optical disc, a first processor circuit having a first memory for storing the data received by the interface circuit and which does not require a refresh, a first signal processor for reading the data from the first memory and performing a first predetermined processing operation on the read data to produce first processed data, the first processed data including a table of contents (TOC), a second memory for temporary storing the first processed data and which requires a refresh, a second processor including a second signal processor for reading the first processed data from the second memory and performing a second predetermined processing operation on the first processed data, and a control computer, coupled to the first and second processor circuit, for providing commands to the first and second processor circuit, the control apparatus comprising:

a control circuit which causes TOC stored in the second memory to be transferred to the first memory before the optical disk player enters a sleep mode and transfers the TOC stored in the first memory to the second memory upon termination of the sleep mode without intervention of the control computer.

12. The control apparatus according to claim 11, further comprising a discrimination circuit for discriminating the TOC from the first processed data stored in the second memory and transferring the discriminated TOC to the first memory.

13. The control apparatus according to claim 11, wherein the TOC is consecutively stored in the second memory beginning at a predetermined address, the control circuit reading the TOC from the second memory at the predetermined address and transferring the TOC to the first memory.

14. The control apparatus according to claim 11, wherein the control circuit includes:

a first memory control circuit for controlling the first memory; and a second memory control circuit for controlling the second memory, the first and the second control circuits being connected together to allow a transfer of the TOC.

15. The control apparatus according to claim 11, wherein the control circuit includes:

a first memory control circuit for controlling the first memory;

a second memory control circuit for controlling the second memory; and a main control circuit for controlling the first and the second memory control circuits, the TOC being transferred via the first and the second memory control circuits and the main control circuit.

16. A control apparatus for an optical disc player including a digital signal processor circuit having an interface circuit for receiving eight to fourteen modulation (EFM) data read from an optical disc, a first memory for storing the EFM data received by the interface circuit in a normal operation mode and which does not require a refresh, a first signal processor for reading the data from the first memory and performing a Cross Interleave Reed Solomon Code (CIRC) processing operation on the read data to produce first processed data, the first processed data including a table of contents (TOC), a second memory for temporary storing the first processed data and which requires a refresh, and a decoder including a second signal processor for reading the first processed data from the second memory and performing a decode processing operation on the first processed data, wherein the control apparatus causes the TOC stored in the second memory to be transferred to the first memory before the optical disk player enters a sleep mode and transfers the TOC stored in the first memory to the second memory upon termination of the sleep mode.

17. The control apparatus according to claim 16, further comprising a discrimination circuit for discriminating the TOC from the first processed data stored in the second memory and transferring the discriminated TOC to the first memory.

18. The control apparatus according to claim 16, wherein the TOC is consecutively stored in the second memory beginning at a predetermined address, the control circuit reading the TOC from the second memory at the predetermined address and transferring the TOC to the first memory.

19. The control apparatus according to claim 16, wherein the control circuit includes:

a first memory control circuit for controlling the first memory; and a second memory control circuit for controlling the second memory, the first and the second control circuits being connected together to allow a transfer of the TOC.

20. The control apparatus according to claim 16, wherein the control circuit includes:

a first memory control circuit for controlling the first memory;

a second memory control circuit for controlling the second memory; and a main control circuit for controlling the first and the second memory control circuits, the TOC being transferred via the first and the second memory control circuits and the main control circuit.

21. A control apparatus for an optical disc player including a digital signal processor circuit having an interface circuit for receiving eight to fourteen modulation (EFM) data read from an optical disc, a first memory for storing the EFM data received by the interface circuit in a normal operation mode and which does not require a refresh, and a first signal processor for reading the data from the first memory and performing a Cross Interleave Reed Solomon Code (CIRC) processing operation on the read data to produce first processed data, the first processed data including a table of contents (TOC), and a second signal processor, coupled to a second memory for temporary storing the first processed data and which requires a refresh, for reading the first processed data from the second memory and performing a decode processing operation on the first processed data, wherein the control apparatus causes the TOC stored in the second memory to be transferred to the first memory before the optical disk player enters a sleep mode and transfers the TOC stored in the first memory to the second memory upon termination of the sleep mode.

22. The control apparatus according to claim 21, further comprising a discrimination circuit for discriminating the TOC from the first processed data stored in the second memory and transferring the discriminated TOC to the first memory.

23. The control apparatus according to claim 21, wherein the TOC is consecutively stored in the second memory beginning at a predetermined address, the control circuit reading the TOC from the second memory at the predetermined address and transferring the TOC to the first memory.

24. The control apparatus according to claim 21, wherein the control circuit includes:

a first memory control circuit for controlling the first memory; and a second memory control circuit for controlling the second memory, the first and the second control circuits being connected together to allow a transfer of the TOC.

25. The control apparatus according to claim 21, wherein the control circuit includes:

a first memory control circuit for controlling the first memory;

a second memory control circuit for controlling the second memory; and a main control circuit for controlling the first and the second memory control circuits, the TOC being transferred via the first and the second memory control circuits and the main control circuit.

* * * * *